United States Patent [19]
Morikawa et al.

[11] Patent Number: 4,905,487
[45] Date of Patent: Mar. 6, 1990

[54] STEERING LOCKING APPARATUS

[75] Inventors: Minoru Morikawa, Niwa; Yonetsugu Umemoto; Toru Tanaka, both of Toyota, all of Japan

[73] Assignee: Kabushiki Kaisha Tokai-Rika-Denki-Seisakusho, Aichi, Japan

[21] Appl. No.: 325,155

[22] Filed: Mar. 17, 1989

[30] Foreign Application Priority Data

Apr. 1, 1988 [JP] Japan ................................. 63-45169

[51] Int. Cl.⁴ ............................................. B60R 25/02
[52] U.S. Cl. ...................................... 70/186; 70/252; 292/DIG. 37
[58] Field of Search .......................... 70/252, 182–186; 292/DIG. 37

[56] References Cited

U.S. PATENT DOCUMENTS

| | | | |
|---|---|---|---|
| 1,601,024 | 9/1926 | Jacobson | 292/DIG. 37 X |
| 3,859,828 | 1/1975 | Ibuka et al. | 70/252 |
| 4,433,562 | 2/1984 | Tsuchiya | 70/252 X |
| 4,671,085 | 6/1987 | Yamaguchi et al. | 70/248 |
| 4,724,722 | 2/1988 | Beauch et al. | 70/248 X |

FOREIGN PATENT DOCUMENTS

| | | | |
|---|---|---|---|
| 2212852 | 9/1972 | Fed. Rep. of Germany | 70/252 |
| 0097936 | 8/1979 | Japan | 70/252 |
| 55-102750 | 8/1980 | Japan . | |
| 58-8443 | 1/1983 | Japan . | |
| 62-441 | 1/1987 | Japan . | |

Primary Examiner—Lloyd A. Gall
Attorney, Agent, or Firm—Oliff & Berridge

[57] ABSTRACT

A steering locking apparatus for a vehicle is designed in such a way that the rotation of a key rotor located at an unlocking position to a locked position by the rotation of a key is prevented by a restricting lever and the prevention of the rotation of the key rotor is removed by pressing a pressing button so as to allow the key rotor to be rotated to the locked position. In a state wherein the pressing of the pressing button is prevented by operating an electromagnetic solenoid under predetermined conditions and thereby engaging a plunger supported by a plunger of the electromagnetic solenoid with the pressing button, the load applied to the pressing button is received by a car body through the stopper plate. In consequence, no load is exerted on the plunger.

18 Claims, 7 Drawing Sheets

STEERING LOCKING APPARATUS

BACKGROUND OF THE INVENTION

1. Industrial Field of the Invention:

The present invention relates to a steering locking apparatus in which the rotation of a key rotor located at an unlocked position to a locked position is restricted by a restricting lever. To remove the restriction of the rotation of the key rotor a button should be pressed.

2. Description of the Related Art:

In conventional steering locking apparatuses of the type, the rotation of a key located at any of a plurality of unlocked positions to a locked position is restricted by a restricting lever. This restriction prevents the key from being carelessly rotated to the locked position when the key is rotated between any combination of unlocked positions, e.g., between "ON" and "ACC". When a driver desires to rotate the key rotor to the locked position when the vehicle is at a stop, he or she presses the pressing button. This removes the restriction of the rotation of the key rotor. In this apparatus, the key rotor can be rotated with the key from any unlocked position of the locked position by operating the pressing button either during the running of a vehicle or while the vehicle is at a stop.

Accordingly, Japanese Pat. Application Laid-Open Nos. 55-102750 and 58-8443 disclose a steering locking apparatus in which a plunger of an electromagnetic solenoid is engaged with a locking cam so as to prevent the rotation of the key rotor to a locked position during the running of the vehicle. However, in these apparatuses, since the rotation force acting on the locking cam is received by the plunger of the electromagnetic solenoid, the amount of load applied to the plunger is large. For this reason a large electromagnetic solenoid is required. Further, when an electromagnetic solenoid is removed unfairly, an opening that leads to a locking cam is formed. This allows a locking bar to be readily operated from the outside through the opening.

SUMMARY OF THE INVENTION

Accordingly, an object of the present invention is to provide a steering locking apparatus in which a pressing button is restricted under predetermined conditions so as to reliably prevent the rotation of a key rotor to a locked position during the running of a vehicle by employing a small electromagnetic solenoid that is designed in such a way as to insure that a locking bar cannot be operated easily from the outside when the electromagnetic solenoid is unfairly removed.

Furthermore, Japanese Utility Model Application Laid-Open No. 62-441 proposes a structure in which a key cannot be rotated to a locked position unless a light is turned off. In order to achieve this, the pressing of a manually operated member is blocked by a plunger. In that case, the pressing force of the manually operated member is directly received by the side surface of the plunger. As a plunger is a component manufactured with a high degree of accuracy the application of the lateral load to the plunger causes deformation or backlash thereof leading to malfunction. To prevent this, a plunger large enough so as to not be affected by the lateral load is required.

To this end, the present invention provides a steering locking apparatus for a vehicle which comprises: a key rotor into which a key can be inserted into tnat can be rotated from a first position at to a second position at which the key once inserted cannot be removed therefrom by means of the key inserted thereinto; first and second cam means that can be rotated together with the key rotor; a locking member move back and forth between a locking position at which it locks steering and an unlocking position at which it unlocks steering by rotating the first cam means; a lever that can be moved between a third position which is outside the locus of rotation of the second cam means and at which it allows rotation of the key rotor and a fourth position which is inside the locus of rotation of the second cam means and at which it prevents the key rotor from rotating from the second position to the first position. The lever is located at the third position when the key rotor is located at the first position and is moved to the fourth position when the key rotor is rotated from the first position to the second position; a pressing button for moving the lever from the fourth position to the third position by pressing operation in a state where the lever is at the fourth position so as to allow the key rotor to be rotated from the second position to the first position; and a pressing button locking means including an electromagnetic solenoid operated under predetermined conditions, and a stopper member supported by a plunger of the electromagnetic solenoid. The stopper member is movable between a fifth position, at which it prevents the pressing of the pressing button and transmits the load applied to the pressing button to a car body of a vehicle, and a sixth position at which it allows the pressing of the pressing button. The stopper member is moved from the sixth position to the fifth position by the operation of the electromagnetic solenoid.

In consequence, even if the pressing button is pressed when the stopper member is located at the fifth position, the load applied to the pressing button is received by the car body through the stopper member, and thus does not act on the plunger. Further, the present invention provides a steering locking apparatus which comprises: a key rotor which allows a key to be inserted thereinto and removed therefrom when it is located at a locked position, the key rotor being capable of being rotated from the locked position to an unlocked position by rotating the key inserted thereinto; a cam shaft coupled to the key rotor so that it can be rotated together with the key rotor, the cam shaft having a locking cam and a restricting cam formed on the outer periphery thereof; a locking member moved back and forth between a locking position at which it locks steering and an unlocking position at which it unlocks steering by rotating the locking cam; a restricting lever that is opposed to a convex portion of the restricting cam so that it allows the rotation of the key rotor when the key rotor is at the locked position, the restricting lever being moved in one direction and opposed to a recessed portion of the restricting cam so that it prevents the rotation of the key rotor from the unlocked position to the locked position by rotating the key rotor to the unlocked position; a pressing button for moving the restricting lever in the other direction and thereby disengaging it from the recessed portion of the restricting cam so as to allow the key rotor to be rotated from the unlocked position to the locked position when it is pressed; and an electromagnetic solenoid operated under predetermined conditions so as to restrict the movement of the pressing button.

In the present invention, since the movement of the pressing button is restricted by the operation of the electromagnetic solenoid under predetermined conditions, careless operation of the pressing button can be reliably prevented. Further, the above-described structure requires a small electromagnetic solenoid. It also makes operation of a locking bar from outside difficult, preventing unfair unlocking of the locking bar.

DESCRIPTION OF THE PREFERRED EMBODIMENTS

Figure 1:
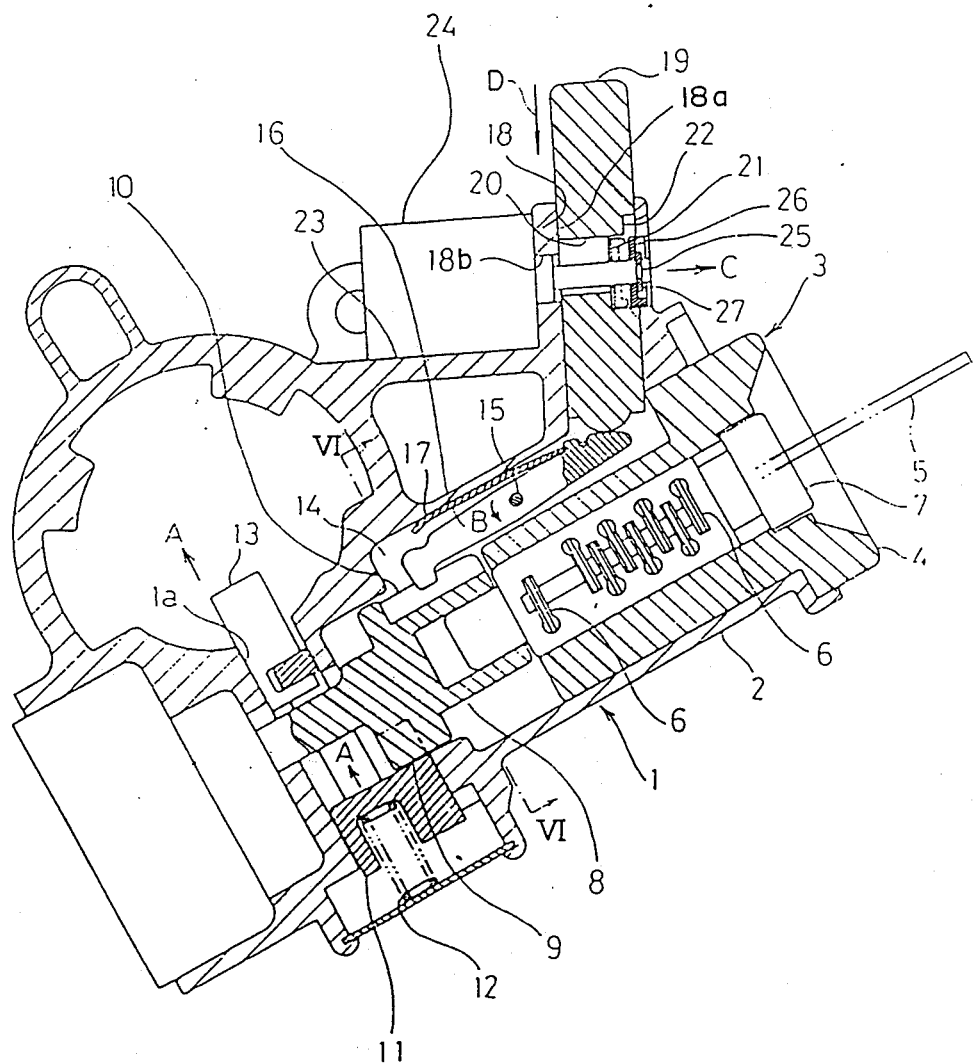
FIG. 1 is a cross-sectional view of a steering locking apparatus, showing a first embodiment of the present invention.
Figure 2:
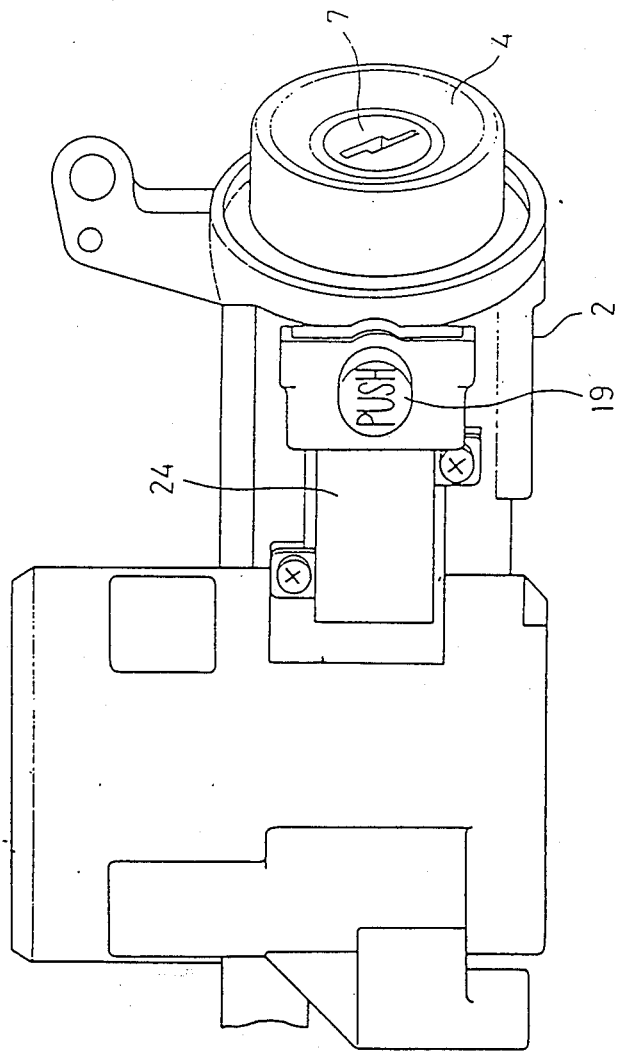
FIG. 2 is a side elevational view of the apparatus of FIG. 1.
Figure 3:
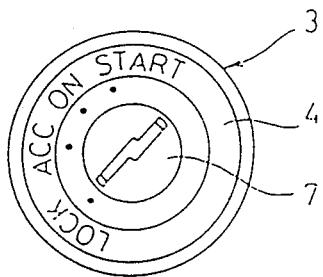
FIG. 3 is a front view of a key cylinder employed in the apparatus of FIG. 1.
Figure 4:
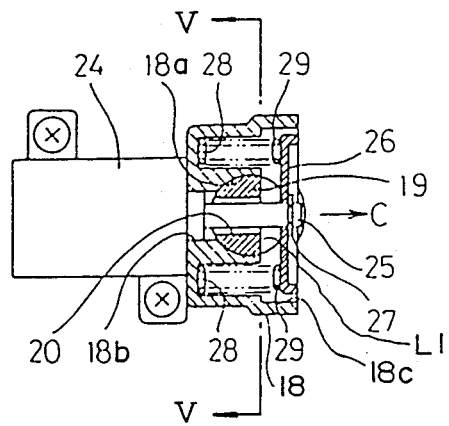
FIG. 4 is a cross-sectional view of the essential parts of the apparatus of FIG. 1.
Figure 5:
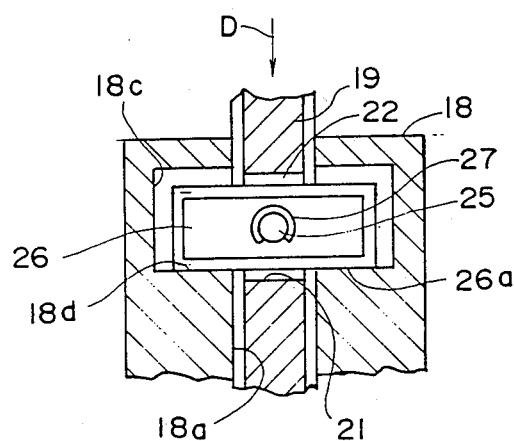
FIG. 5 is a sectional view taken along line V—V of FIG. 4.

A first embodiment of the present invention will be described below with reference to FIGS. 1 to 4. A housing 1 is fixed to a steering column (not shown), and a key cylinder 3 is inserted into a cylindrical portion 2 of the housing 1. The key cylinder 3 has a cylinder casing 4 and a key rotor 7 disposed in the casing 4. The key rotor 7 has a plurality of tumblers 6. When a key 5 is inserted into the key rotor 7, the tumblers 6 are retracted into the key rotor 7, and the key rotor 7 can be rotated by the key 5. A cam shaft 8 is coupled to the rear end portion (the inner end portion) of the key rotor 7, and an ignition switch (not shown) is coupled to the axially rear end (the inner end) of the cam shaft 8, that is, to the left end as viewed in FIG. 1. A locking cam 9 is formed on the outer periphery of the axially intermediate portion of the cam shaft 8, and a restricting cam 10 is formed on the outer periphery of the right end of the cam shaft 8. A movable frame 11, which is a locking member driven by the locking cam 9, is disposed in the housing 1 in such a manner as to be movable back and forth in the direction indicated by arrow A. The movable frame 11 is normally urged by a coil spring 12 in the direction indicated by arrow A. A locking bar 13, which is a locking member coupled to this movable frame 11, is supported by the inner peripheral portion of a supporting portion 1a of the housing 1 in such a manner as to be slidable therealong. When the locking bar 13 is moved in the direction indicated by arrow A, the forward end thereof fits in a locking groove in a steering shaft (not shown) and thereby locks the steering shaft. In the outer periphery of the cylinder casing 4 of the key cylinder 3 is formed a groove portion 14 which is extended in the axial direction of the cylinder casing 4. A restricting lever 16 is pivotably supported in this groove portion 14 by means of a shaft 15 which is extended perpendicular to the axis of the cylinder casing 4. The restricting lever 16 is urged in the direction indicated by arrow B (counterclockwise as viewed in FIG. 1) by a leaf spring 17 that is caulked to the vicinity of the right end of the restricting lever 16. The left end of the restricting lever 16 is located in an opposed relation with the outer peripheral portion of the restricting cam 10. A pressing button supporting portion 18 is integrally formed on the outer periphery of the housing 1. In the pressing button supporting portion 18 there is formed a cylindrical hole 18a which communicates with the interior of the cylindrical portion 2. A cylindrical pressing button 19 is disposed in this cylindrical hole 18a in such a manner as to be slidable in the direction indicated by arrow D (in the direction in which it is pressed). The inner end portion of the pressing button 19 is in contact with the right end as viewed in FIG. 1 of the restricting lever 16. In the axially intermediate portion of the pressing button 19 there are formed a hole 20 elongated along the axis of the pressing button 19, an engaging recessed portion 21 that continues from the elongated hole 20, and an escaping recessed portion 22 that continues from the recessed portion 21. An electromagnetic solenoid 24 is fixed by screws to a mounting portion 23 which is mounted on the housing 1 together with the pressing button supporting portion 18. A plunger 25 of the electromagnetic solenoid 24 passes through a hole 18b formed in the pressing button supporting portion 18 in such a manner that it communicates with the elongated hole 20 the engaging recessed portion 21, and then the escaping recessed portion 22. A stopper plate 26 is fixed to the forward end portion of the plunger 25 by a stopper ring 27. The stopper plate 26 has a substantially rectangular form, and is supported by the plunger 25 in such a manner that the longitudinal direction thereof is substantially perpendicular to the axis of the pressing button 19. Since the longitudinal sides of the stopper plate 26 are made larger than the diameter of the pressing button 19, as shown in FIG. 5, the vicinities of the two longitudinal end portions of the stopper plate 26 are located outside of the pressing button 19, as viewed from above. As shown in FIG. 4, the pressing button supporting portion 18 has two recessed portions 28 formed at positions where they face the vicinities of the longitudinal end portions of the stopper plate 26. The recessed portions 28 respectively receive compression coil springs 29 that urge the stopper plate 26 in the direction in which it is disengaged from the engaging recessed portion 21. The electromagnetic solenoid 24, the stopper plate 26 and the compression coil springs 29 combine to form a pressing button locking means. In consequence, the stopper plate 26 is located within the escaping recessed portion 22 by the urging force of the compression coil springs 29 when the electromagnetic solenoid 24 is deenergized. This enables the pressing button 19 to be pressed. When the electromagnetic solenoid 24 is energized, the stopper plate 26 is moved into the engaging recessed portion 21 against the urging force of the compression coil spring 29 and thereby engages with the engaging recessed portion 21, preventing operation of the pressing button 19.

Further, the entirety of the stopper plate 26 is accommodated in an accommodating portion 18c formed in the pressing button supporting portion 18. The end surface 26a of the stopper plate 26 is in contact with a surface 18d of the accommodating portion 18c which faces this end surface 26a. In consequence, the end surface 26a of the stopper plate 26 slides along the surface 18d during the movement of the stopper plate 26, and when the pressing button 19 is pressed in a state where the stopper plate 26 is located within the engaging recessed portion 21, the load applied to the pressing button acts on the housing 1 through the end surface 26a of the stopper plate 26 and the surface 18d of the accommodating portion 18c but does not act on the plunger 25.

The electromagnetic solenoid 24 is operated, i.e., it is energized under predetermined conditions, i.e., when a sensor (not shown) senses that a vehicle is running. It is deenergized when the sensor senses that the vehicle is at a stopped portion.

Further, in the state where the key rotor 7 is located at a locked position which corresponds to the indication of "LOCK", the key 5 can be inserted into and removed from the key rotor 7. When the key 5 is inserted, the key rotor 7 can be rotated to unlocked positions which are represented by "ACC", "ON" and "START". The key 5 cannot be removed from the key rotor at these unlocked positions.

Figure 6:
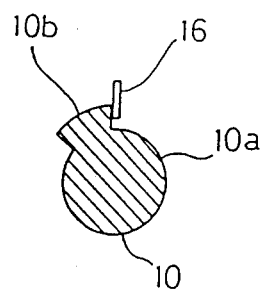
FIG. 6 is a sectional view taken along line VI—VI of FIG. 1.

The operation of the thus-arranged steering locking apparatus will now be described. In the state where the key 5, which is inserted into the key rotor 7, is located at any of the unlocked positions represented by "ACC", "ON" and "START", the locking cam 9 provided in the cam shaft 8 is in a state shown in FIG. 1. In this state, the movable frame 11 is located at an unlocking position against the urging force of the coil spring 12, and the forward end of the locking bar 13 is disengaged from the engaging groove in the steering shaft (not shown), which means that the steering locking apparatus is unlocked. In this state, when the sensor (not shown) senses that the vehicle is running, the plunger 24 is attracted by the energization of the electromagnetic solenoid 24. The stopper plate 26 against the urging force of the compression coil spring 28, is thereby moved in a direction opposite to that indicated by arrow C and engages the stopper plate 26 with the engaging recessed portion 21 of the pressing button 19 and thereby prevents the operation of the pressing button 19. Further, in this state, since the left end of the restricting lever 16 faces a recessed portion 10a in the restricting cam 10 (see FIG. 6), even if attempts are made to rotate the key rotor 7 from "ACC" to "LOCK", the left end of the restricting lever 16 is in contact with the side surface of a convex portion 10b of the restricting cam 10. The pivoting of the restricting lever 16 is thereby prevented. As stated above, since the insertion of the pressing button 19 is prevented during the running of the vehicle, the restricting lever 16 cannot be pivoted in the direction opposite to that indicated by the arrow B. In addition, the key rotor 7 cannot be rotated to its locked position by the combination of the restricting lever 16 and the restricting cam 10.

Once the vehicle is stopped and the electromagnetic solenoid 24 is thereby deenergized, the plunger 25 and the stopper plate 26 are returned in the direction indicated by arrow C by the urging force of the compression coil spring 29, thereby unlocking the pressing button 19. If the pressing button in this state 19 is pressed in the direction indicated by arrow D the restricting lever 16 is pivoted in the direction opposite to that indicated by the arrow B. The left end thereof is thereby disengaged from the recessed portion 10a in the restricting cam 10. This allows the restricting lever 16 to release the cam shaft 8, thus enabling the key rotor 7 to be rotated from "ACC" to "LOCK" through the operation of the key 5. When the key rotor 7 is rotated to "LOCK", the locking cam 9 on the cam shaft 8 is rendered to the state shown by the dot-dot-dash line in FIG. 1. This moves the movable frame 11 and the locking bar 13 in the direction indicated by arrow A, engages the forward end of the locking bar 13 with the engaging groove in the steering shaft (not shown) and thereby locks the steering shaft.

With the above-described arrangement, since the electromagnetic solenoid 24 is energized so that the stopper plate 26 prevents the pressing button 19 from being pressed during the running of the vehicle, the pressing of the pressing button by careless operation can be prevented. This action prevents the key rotor 7 from being rotated to the locked position during the running of the vehicle. Further, the load applied to the stopper plate 26 by pressing the pressing button 19 when the pressing of the pressing button 19 is prevented, that is, when the stopper plate 26 is fitted in the engaging recessed portion 21, the load is received by the surface 18d the accommodating portion 18c with which the stopper plate 26 is in contact. As a result, no lateral load is applied to the plunger 25 of the electromagnetic solenoid 24, and the size of the electromagnetic solenoid 24 employed can be reduced. Furthermore, even if the electromagnetic solenoid 24 is unfairly removed, no opening that leads to the movable frame 11 or the locking bar 13 is formed in the housing 1. This prevents the locking bar 13 from being operated unfairly from outside, thus preventing the unfair unlocking of the steering shaft.

Figure 7:
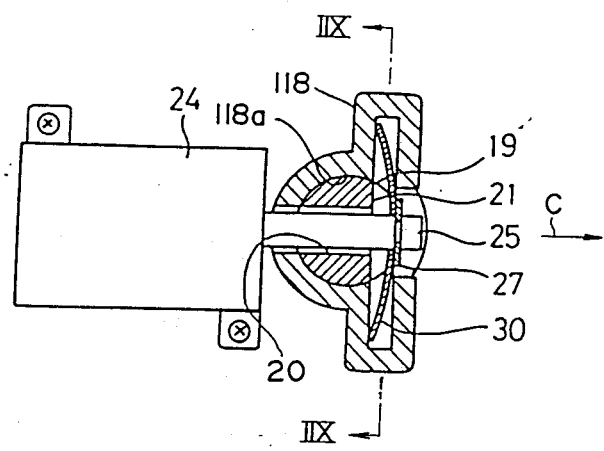
FIG. 7 is a cross-sectional view of the essential parts which corresponds to those shown in FIG. 4, showing a second embodiment of the present invention.
Figure 8:
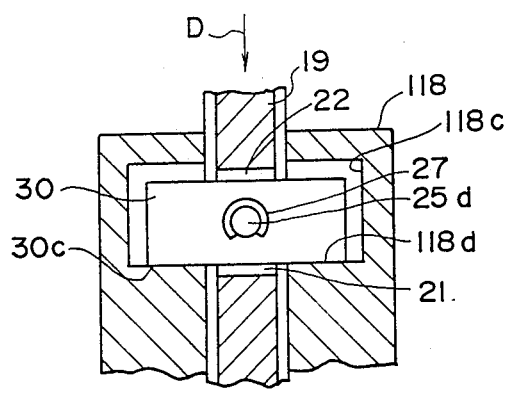
FIG. 8 is a sectional view taken along line IIX—IIX of FIG. 7 which is similar to FIG. 5.

A second embodiment of the present invention will be described below with reference to FIGS. 7 and 8. This second embodiment differs from the first embodiment in the following points: this embodiment employs a stopper plate 30 formed of an arcuate leaf spring in place of the stopper plate 26 and the compression coil spring 29 employed in the first embodiment. The stopper plate 30 is fixed to the forward end portion of the plunger through a stopper ring 27. Further, this modification makes the structure of a button supporting portion 118 different from that of the button supporting portion 18 in the first embodiment. However, both button supporting portions 118 and 18 function in the same manner. In consequence, in this embodiment, an end surface 30a (the side of the stopper plate 30 which is pressed by the pressing button 19) of the stopper plate 30 accommodated in an accommodating portion 118c is in contact with a surface 118d of the accommodating portion 118c as in the first embodiment. As a result, when the pressing button 19 is pressed in the state where the stopper plate 30 is fitted in the engaging recessed portion 21, the pressing load acts on the pressing button supporting portion 118 through the stopper plate 30 and the surface 118d does not act on the plunger 25.

Figure 9:
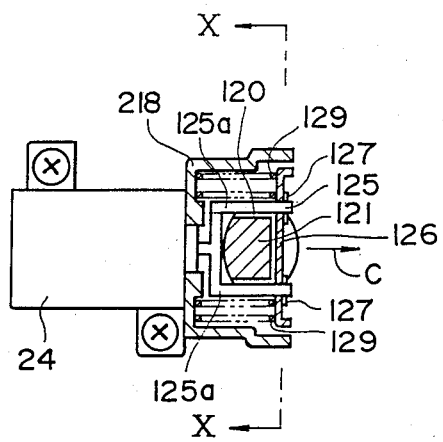
FIG. 9 a cross-sectional view of the essential parts which corresponds to those shown in FIG. 4, showing a third embodiment of the present invention.
Figure 10:
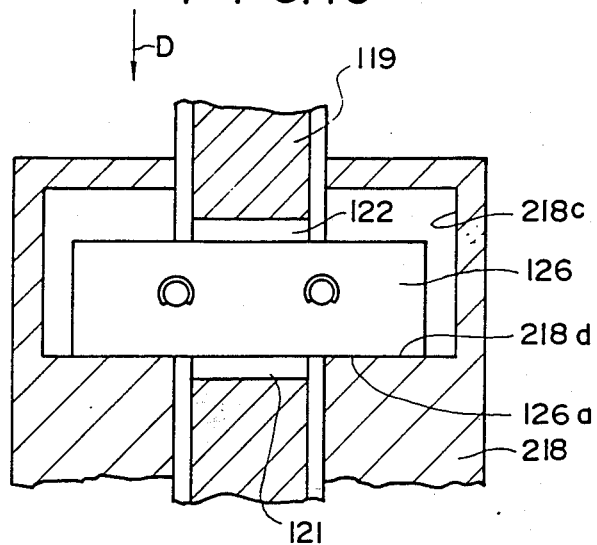
FIG. 10 a sectional view taken along line X—X of FIG. 9, which is similar to FIG. 5.

A third embodiment of the present embodiment will be described below with reference to FIGS. 9 and 10. This embodiment differs from the above-described first embodiment in that the bar-shaped plunger 25 employed in the first embodiment is replaced by a bifurcated plunger 125, and in that the elongated hole 20 formed in the pressing button 19 is substituted by a pair of grooves 120 which are formed in opposed relation to the bifurcated portions 125a of the plunger 125 so that they movably accommodate the bifurcated portions 125a. These modifications make the configuration of a pressing button supporting portion 218 slightly different from that of the pressing button supporting portion 18 in the first embodiment, as shown in FIG. 9. Further, a stopper plate 126 is fixed to the forward ends of the bifurcated portions 125a of the plunger 125 through stop rings 127. In the vicinity of the two end portions of the stopper plate 126 are disposed compression coil springs 129 for urging the stopper plate 126 in the direction indicated by arrow C in the same manner as that of the compression coil springs 29 employed in the first embodiment.

In consequence, in this embodiment, an end surface 126a (the side of the stopper plate 126 which is pressed by a pressing button 119) of the stopper plate 126 accommodated in an accommodating portion 218c is in contact with a surface 218d of the accommodating portion 218c, as in the first embodiment. As a result, when the pressing button 119 is pressed in the state where the stopper plate 126 is fitted in the engaging recessed portion 121, the pressing load acts on the pressing button supporting portion 218 through the stopper plate 126 and the surface 218d but does not act on the plunger 125. An escaping recessed portion 122 in this embodiment has the same function as that of the escaping recessed portion 22 in the first embodiment.

As stated above, in the present invention, since the pressing force applied to the pressing button is received not by the plunger but by the stopper plate, no force acts on the plunger. Further, since the stopper plate is fitted in and disengaged from the engaging portions formed in the pressing button, the stroke of the plunger can be made small, thereby enabling the reduction in the size of the plunger employed.

As will be understood from the foregoing description, a steering locking apparatus includes: a key rotor which allows a key to be inserted thereinto and removed therefrom when it is located at a locked position, the key rotor being capable of being rotated from the locked position to the unlocked position by the key inserted thereinto; a cam shaft coupled to the key rotor so that it is rotated together with the key rotor, the cam shaft having a locking cam and a restricting cam formed on the outer periphery thereof; a locking member which is moved back and forth between a locking position at which it locks steering and an unlocking position at which it unlocks steering by rotating the locking cam; a restricting lever that is opposed to a convex portion of the restricting cam so that it allows rotating of the key rotor when the key rotor is at the locked position, the restricting lever being moved in one direction and opposed to a recessed portion of the restricting cam so that it prevents the rotation of the key rotor from the unlocked position to the locked position by rotating the key rotor to the unlocked position; a pressing button for moving the restricting lever in the other direction and thereby disengaging it from the recessed portion of the restricting cam so as to allow the key rotor to be rotated from the unlocked position to the locked position when it is pressed; and an electromagnetic solenoid operated under predetermined conditions so as to restrict the movement of the pressing button. In consequence, since the movement of the pressing button is restricted under predetermined conditions, the rotation of the key rotor to the locked position during the running of the vehicle can be reliably prevented. Further, the above-described structure requires a small electromagnetic solenoid. It also makes operation of a locking bar from outside difficult, which would occur when the electromagnetic solenoid is unfairly removed.

What is claimed is:

1. A steering locking apparatus for a vehicle, comprising:
   a key rotor that can be rotated from a first position at which a key can be inserted into and removed therefrom to a second position at which said key inserted cannot be removed therefrom by means of the key inserted thereinto;
   first and second cam means rotated together with said key rotor;
   a locking member moved back and forth between a locking position at which it locks steering and an unlocking position at which it unlocks steering by rotating said first cam means;
   a lever that can be moved between a third position which is outside the locus of rotation of said second cam means and at which said lever allows rotation of said key rotor and a fourth position which is inside the locus of rotation of said second cam means and at which said lever prevents said key rotor from rotating from said second position to said first position, said lever being located at said third position when said key rotor is located at said first position and being moved to said fourth position when said key rotor is rotated from said first position to said second position;
   a pressing button for moving said lever from said fourth position to said third position by being pressed in a state where said lever is at said fourth position so as to allow said key rotor to be rotated from said second position to said first position; and
   a pressing button locking means including an electromagnetic solenoid operated under predetermined conditions, and a stopper member supported by a plunger of said electromagnetic solenoid, said stopper member being movable between a fifth position at which it prevents the pressing of said pressing button and at which it transmits the load from a pressing force applied to said pressing button to a car body of a vehicle and a sixth position at which it allows the pressing of said pressing button, said stopper member being moved from said sixth position to said fifth position by the operation of said electromagnetic solenoid.

2. A steering locking apparatus for a vehicle according to claim 1, wherein said pressing button locking means includes an urging means for moving said stopper member to said sixth position when said electromagnetic solenoid is not operated.

3. A steering locking apparatus for a vehicle according to claim 2, wherein said stopper member itself serves as said urging means.

4. A steering locking apparatus for a vehicle according to claim 1, wherein said pressing button is a substantially columnar body which is elongated in the direction in which it is pressed.

5. A steering locking apparatus for a vehicle according to claim 4, wherein said plunger passes through a hole formed in said pressing button in such a manner as to be elongated along the axis of said pressing button, and wherein said stopper member is supported by the forward end of said plunger.

6. A steering locking apparatus for a vehicle according to claim 5, wherein an engaging recessed portion is formed in said pressing button in such a manner that it communicates with said elongated hole, and wherein said stopper member is fitted in said engaging recessed portion when it is located at said fifth position and is disengaged from said engaging recessed portion when it is at said sixth position.

7. A steering locking apparatus for a vehicle according to claim 4, wherein said plunger has bifurcated portions, which are located at two sides of said pressing button.

8. A steering locking apparatus for a vehicle according to claim 1, including a cam shaft coupled to said key rotor so that it is rotated together with said key rotor, said first and second cam means being formed on the outer peripheral portion of said cam shaft.

9. A steering locking apparatus for a vehicle according to claim 1, including a housing for supporting said key rotor, said pressing force being transmitted through said housing to said car body.

10. A steering locking apparatus for a vehicle, comprising:
a housing fixed to a car body;
a key rotor supported by said housing, said key rotor allowing a key to be inserted thereinto and removed therefrom when it is located at a locked position, said key rotor being capable of being rotated from said locked position to an unlocked position by inserting said key;
a cam shaft coupled to said key rotor so that it can be rotated together with said key rotor, the outer peripheral portion of said cam shaft being provided with a locking cam and a restricting cam with recessed and convex portions formed thereon;
a locking member moved back and forth between a first position where it locks steering and a second position where it unlocks steering by the rotation of said locking cam;
a restricting lever that is opposed to said convex portion of said restricting cam so that it allows rotating of said key rotor when said key rotor is at said locked position, said restricting lever being moved in one direction and opposed to said recessed portion of said restricting cam so that it prevents rotating of said key rotor from said unlocked position to said locked position by rotating said key rotor to said unlocked position;
a pressing button for moving said restricting lever in an opposite direction and thereby disengaging it from said recessed portion of said restricting cam so as to allow said key rotor to be rotated from said unlocked position to said locked position when it is pressed; and
a pressing button locking means including an electromagnetic solenoid operated under predetermined conditions, a stopper plate supported by a plunger of said electromagnetic solenoid, said stopper plate being capable of being moved between a pressing preventing position at which it prevents pressing of said pressing button and at which it transmits the load applied to said pressing button to said housing so that the load can be supported by said housing and a pressing permitting position at which it permits pressing of said pressing button, said stopper plate being moved from said pressing permitting position to said pressing preventing position by the operation of said electromagnetic solenoid.

11. A steering locking apparatus according to claim 10, wherein said pressing button locking means includes an urging means for moving said stopper plate to said pressing permitting position when said electromagnetic solenoid is deenergized.

12. A steering locking apparatus according to claim 11, wherein said urging means includes a spring supported at one end portion thereof by said housing and at the other end portion by said stopper plate for urging said stopper plate to said pressing permitting position 13. A steering locking apparatus according to claim 11, wherein said stopper plate is a spring member, and wherein said urging means is said stopper plate.

14. A steering locking apparatus according to claim 10, wherein said pressing button is a substantially columnar body which is elongated in the direction in which it is pressed.

15. A steering locking apparatus according to claim 14, wherein said plunger passes through a hole formed in said pressing button in such a manner that it elongated along the axis of said pressing button, and wherein said stopper plate is fixed to the forward end of said plunger.

16. A steering locking apparatus according to claim 15, wherein an engaging recessed portion is formed in said pressing button in such a manner that it communicates with said elongated hole, and wherein said stopper plate is fitted in said engaging recessed portion when it is located at said pressing preventing position and is disengaged from said engaging recessed portion when it is at said pressing permitting position.

17. A steering locking apparatus according to claim 14, wherein said plunger has bifurcated portions, which are located at two sides of said pressing button.

18. A steering locking apparatus according to claim 10, wherein an end surface of said stopper plate is in contact with a portion of said housing when said stopper plate is at said pressing preventing position.

* * * * *